US012206177B2

(12) United States Patent
Oh et al.

(10) Patent No.: US 12,206,177 B2
(45) Date of Patent: Jan. 21, 2025

(54) METHOD AND APPARATUS FOR RADIO SIGNAL TRANSMISSION AND RECEPTION IN COMMUNICATION SYSTEM

(71) Applicant: ELECTRONICS AND TELECOMMUNICATIONS RESEARCH INSTITUTE, Daejeon (KR)

(72) Inventors: Jung Hoon Oh, Daejeon (KR); Jang Yeol Kim, Daejeon (KR); Jae Ho Lee, Daejeon (KR); Hyun Joon Lee, Daejeon (KR); In Kui Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 68 days.

(21) Appl. No.: 17/978,255

(22) Filed: Nov. 1, 2022

(65) Prior Publication Data

US 2023/0135487 A1 May 4, 2023

(30) Foreign Application Priority Data

Nov. 1, 2021 (KR) ........................ 10-2021-0148258
Oct. 31, 2022 (KR) ........................ 10-2022-0142606

(51) Int. Cl.
*H01Q 21/24* (2006.01)
*H01Q 15/24* (2006.01)

(52) U.S. Cl.
CPC ............. *H01Q 21/24* (2013.01); *H01Q 15/24* (2013.01)

(58) Field of Classification Search
CPC ....... H01Q 1/1257; H01Q 15/24; H01Q 21/24
See application file for complete search history.

(56) References Cited

U.S. PATENT DOCUMENTS 8,755,833 B2 6/2014 Anreddy et al.
8,779,976 B2 7/2014 Eom et al.
(Continued)

FOREIGN PATENT DOCUMENTS

KR 20180056781 A 5/2018
KR 20190142827 A 12/2019
(Continued)

OTHER PUBLICATIONS

Jeon, J. et al., "Six-dimensional polarization technology for 5G systems", DBpia, The Journal of The Korean Institute of Communication Sciences, vol. 29, No. 8, pp. 10-16, Jul. 2012; with English abstract.

(Continued)

*Primary Examiner* — Thien M Le
(74) *Attorney, Agent, or Firm* — Rabin & Berdo, P.C.

(57) ABSTRACT

An operation method of a first communication node may comprise: receiving one or more polarized radio signals transmitted from a second communication node included in the communication system through one or more receive polarized antennas included in the first communication node; performing a receive polarized antenna alignment state adjustment operation so that a detection result for a magnitude of an electric field excited by the one or more polarized radio signals is maximized; and receiving a first polarized signal transmitted from the second communication node through at least part of the one or more receive polarized antennas based on a result of the receive polarized antenna alignment state adjustment operation.

5 Claims, 8 Drawing Sheets

(56) References Cited

U.S. PATENT DOCUMENTS

| | | | | |
|---|---|---|---|---|
| 8,811,525 | B2 | 8/2014 | Eom et al. | |
| 9,379,435 | B2 | 6/2016 | Moon et al. | |
| 10,039,011 | B2 | 7/2018 | Bahng et al. | |
| 10,419,095 | B2 | 9/2019 | Kang et al. | |
| 10,886,623 | B2 | 1/2021 | Son et al. | |
| 11,564,027 | B1 * | 1/2023 | Hawk | H01Q 17/00 |
| 11,949,174 | B1 * | 4/2024 | Li | H01Q 9/0435 |
| 2007/0046558 | A1 * | 3/2007 | Tillery | H01Q 1/246 343/797 |
| 2017/0033466 | A1 * | 2/2017 | Henry | H01Q 9/0485 |
| 2017/0033953 | A1 * | 2/2017 | Henry | H04L 12/6418 |
| 2017/0229782 | A1 * | 8/2017 | Adriazola | H01Q 1/2291 |
| 2018/0151957 | A1 * | 5/2018 | Bennett | H01Q 15/08 |
| 2018/0233820 | A1 | 8/2018 | Chen et al. | |
| 2018/0331413 | A1 * | 11/2018 | Adriazola | H01Q 1/103 |
| 2019/0074580 | A1 * | 3/2019 | Henry | H04B 3/54 |
| 2019/0074865 | A1 * | 3/2019 | Henry | H01Q 1/46 |
| 2022/0190476 | A1 * | 6/2022 | Lenive | H01Q 15/147 |

FOREIGN PATENT DOCUMENTS

| | | | |
|---|---|---|---|
| KR | 10-2289946 | B1 | 8/2021 |
| KR | 10-2021-0118777 | A | 10/2021 |
| KR | 20210119824 | A | 10/2021 |
| WO | 2014/208993 | A1 | 12/2014 |
| WO | 2016/111428 | A1 | 7/2016 |

OTHER PUBLICATIONS

Khan, S. et al., "Role of dressed-state interference in electromagnetically induced transparency", Physics Letters A, vol. 380, pp. 4100-4104, Oct. 20, 2016.

* cited by examiner

METHOD AND APPARATUS FOR RADIO SIGNAL TRANSMISSION AND RECEPTION IN COMMUNICATION SYSTEM

CROSS-REFERENCE TO RELATED APPLICATIONS

This application claims priority to Korean Patent Applications No. 10-2021-0148258, filed on Nov. 1, 2021, and No. 10-2022-0142606, filed on Oct. 31, 2022, with the Korean Intellectual Property Office (KIPO), the entire contents of which are hereby incorporated by reference.

BACKGROUND

1. Technical Field

Exemplary embodiments of the present disclosure relate to a method and an apparatus for radio signal transmission and reception in a communication system, and more particularly, to a radio signal transmission and reception technique for improving communication performance in a communication system supporting polarization-based communication and/or beam-based communication.

2. Related Art

With the development of information and communication technology, various wireless communication technologies are being developed. Representative wireless communication technologies include long term evolution (LTE) and new radio (NR) defined as the 3$^{rd}$ generation partnership project (3GPP) standards. The LTE may be one of 4$^{th}$ generation (4G) wireless communication technologies, and the NR may be one of 5$^{th}$ generation (5G) wireless communication technologies. A wireless communication technology after the 5G wireless communication technology (e.g., the sixth generation (6G) wireless communication technology, etc.) may be referred to as 'beyond-5G (B5G) wireless communication technology'.

An exemplary embodiment of the communication system may support polarization-based communication. In the polarization-based communication, a transmit antenna used by a transmitting node and/or a receive antenna used by a receiving node may correspond to a polarized antenna. A radio signal transmitted by the transmitting node using a transmit polarized antenna may correspond to a polarized electromagnetic wave. The polarized electromagnetic wave may be composed of an electric field having the greatest intensity in a specific direction on a plane perpendicular to a propagation axis and a magnetic field perpendicular to the electric field. Radio signals polarized in different directions may have little or no possibility of mutual interference. On the other hand, when the polarized radio signal transmitted from the transmit polarized antenna is received through the receive polarized antenna, if a polarization axis of the transmit polarized antenna and a polarization axis of the receive polarized antenna do not match, the energy of the polarized radio signal may not be delivered sufficiently to the receiving node. In other words, in order to maximize transmission efficiency between the transmitting node and the receiving node in polarization-based communication, the polarization axis of the transmit polarized antenna and the polarization axis of the receive polarized antenna may need to be aligned in the same direction. Meanwhile, an exemplary embodiment of the communication system may support beam-based communication. Antennas supporting beam-based communication may have a high reception gain under a line-of-sight (LOS) condition and a low reception gain under a non-LOS (NLOS) condition. In beam-based communication, when the LOS condition is satisfied and the transmit antenna of the transmitting node and the receive antenna of the receiving node are aligned on a plane perpendicular to a mutual radio signal propagation direction, the reception efficiency can be maximized. A technique for improving radio signal transmission/reception efficiency in polarization-based communication and/or beam-based communication may be required.

Matters described as the prior arts are prepared to help understanding of the background of the present disclosure, and may include matters that are not already known to those of ordinary skill in the technology domain to which exemplary embodiments of the present disclosure belong.

SUMMARY

Accordingly, exemplary embodiments of the present disclosure are provided to substantially obviate one or more problems due to limitations and disadvantages of the related art.

Exemplary embodiments of the present disclosure are directed to providing a radio signal transmission and reception method and apparatus capable of easily adjusting an antenna alignment state of a receiving node for improving transmission efficiency in a communication system supporting polarization-based communication and/or beam-based communication.

According to a first exemplary embodiment of the present disclosure, an operation method of a first communication node in a communication system may comprise: receiving one or more polarized radio signals transmitted from a second communication node included in the communication system through one or more receive polarized antennas included in the first communication node; performing a receive polarized antenna alignment state adjustment operation so that a detection result for a magnitude of an electric field excited by the one or more polarized radio signals is maximized; and receiving a first polarized signal transmitted from the second communication node through at least part of the one or more receive polarized antennas based on a result of the receive polarized antenna alignment state adjustment operation.

The performing of the receive polarized antenna alignment state adjustment operation may comprise: obtaining a first detection result through electric field detection when an alignment state of the one or more receive polarized antennas is a first alignment state; changing the alignment state of the one or more receive polarized antennas to a second alignment state; obtaining a second detection result through electric field detection when the alignment state of the one or more receive polarized antennas is the second alignment state; and determining an alignment state of the one or more receive polarized antennas based on a result of comparison between the first detection result and the second detection result.

The one or more receive polarized antennas may include at least a first receive polarized antenna and a second receive polarized antenna, and the performing of the receive polarized antenna alignment state adjustment operation may comprise: performing electric field detection while changing whether to turn on/off each of the first and second receive polarized antennas, in a situation in which a third alignment state of the first receive polarized antenna and a fourth alignment state of the second receive polarized antenna are different from each other; selecting one of the third alignment state and the fourth alignment state based on a result of the electric field detection; and determining to receive the first polarized signal through one receive polarized antenna corresponding to the selected alignment state.

The one or more receive polarized antennas may include at least a first receive polarized antenna and a second receive polarized antenna, and the performing of the receive polarized antenna alignment state adjustment operation may comprise: performing electric field detection while changing whether to turn on/off each of the first and second receive polarized antennas, in a situation in which alignment states of the first receive polarized antenna and the second receive polarized antenna are different from each other; selecting a relatively favorable fifth alignment state and a relatively unfavorable sixth alignment state among the alignment states of the first receive polarized antenna and the second receive polarized antenna based on a result of the electric field detection; and adjusting a direction of a receive polarized antenna corresponding to the sixth alignment state based on the fifth alignment state.

The performing of the receive polarized antenna alignment state adjustment operation may comprise: passing an electric field excited by the one or more polarized radio signals through a rubidium vapor cell in a Rydberg electromagnetically induced transparency (EIT) state, the rubidium vapor cell being included in the first communication node; and detecting the magnitude of the electric field based on a degree in which an EIT signal is separated in the rubidium vapor cell.

The performing of the receive polarized antenna alignment state adjustment operation may further comprise transmitting a first indication signal indicating that the receive polarized antenna alignment state adjustment operation is completed to the second communication node, and the first polarized signal may be transmitted from the second communication node based on the first indication signal.

According to a second exemplary embodiment of the present disclosure, a first communication node in a communication system may comprise: a processor; and one or more receive antennas, wherein the processor causes the first communication node to: receive one or more radio signals transmitted based on beamforming from a second communication node included in the communication system, through the one or more receive antennas; perform a receive antenna alignment state adjustment operation so that a detection result for a magnitude of an electric field excited by the one or more radio signals is maximized; and receive a first radio signal transmitted based on beamforming from the second communication node through at least part of the one or more receive antennas.

In the performing of the receive antenna alignment state adjustment operation, the processor may further cause the first communication node to: obtain a first detection result through electric field detection when an alignment state of the one or more receive antennas is a first alignment state; change the alignment state of the one or more receive antennas to a second alignment state; obtain a second detection result through electric field detection when the alignment state of the one or more receive antennas is the second alignment state; and determine an alignment state of the one or more receive antennas based on a result of comparison between the first detection result and the second detection result.

The one or more receive antennas may include at least a first receive antenna and a second receive antenna, and in the performing of the receive antenna alignment state adjustment operation, the processor may further cause the first communication node to: perform electric field detection while changing whether to turn on/off each of the first and second receive antennas, in a situation in which a third alignment state of the first receive antenna and a fourth alignment state of the second receive antenna are different from each other; select one of the third alignment state and the fourth alignment state based on a result of the electric field detection; and determine to receive the first radio signal through one receive antenna corresponding to the selected alignment state.

The processor may further cause the first communication node to, after performing the receive antenna alignment state adjustment operation, transmit a first indication signal indicating that the receive antenna alignment state adjustment operation is completed to the second communication node, wherein the first radio signal may be transmitted from the second communication node based on the first indication signal.

According to the exemplary embodiments of a method and apparatus for transmitting and receiving radio signals in a communication system, in a communication system supporting polarization-based communication and/or beam-based communication, an alignment state of a receive antenna of a receiving node may be adjusted based on a result of electric field measurement on a received signal. Through this, transmission/reception efficiency between a transmitting node and the receiving node can be maximized without a separate feedback procedure for the transmitting node or a separate antenna adjustment procedure at the transmitting node.

DETAILED DESCRIPTION OF THE EMBODIMENTS

Figure 1:
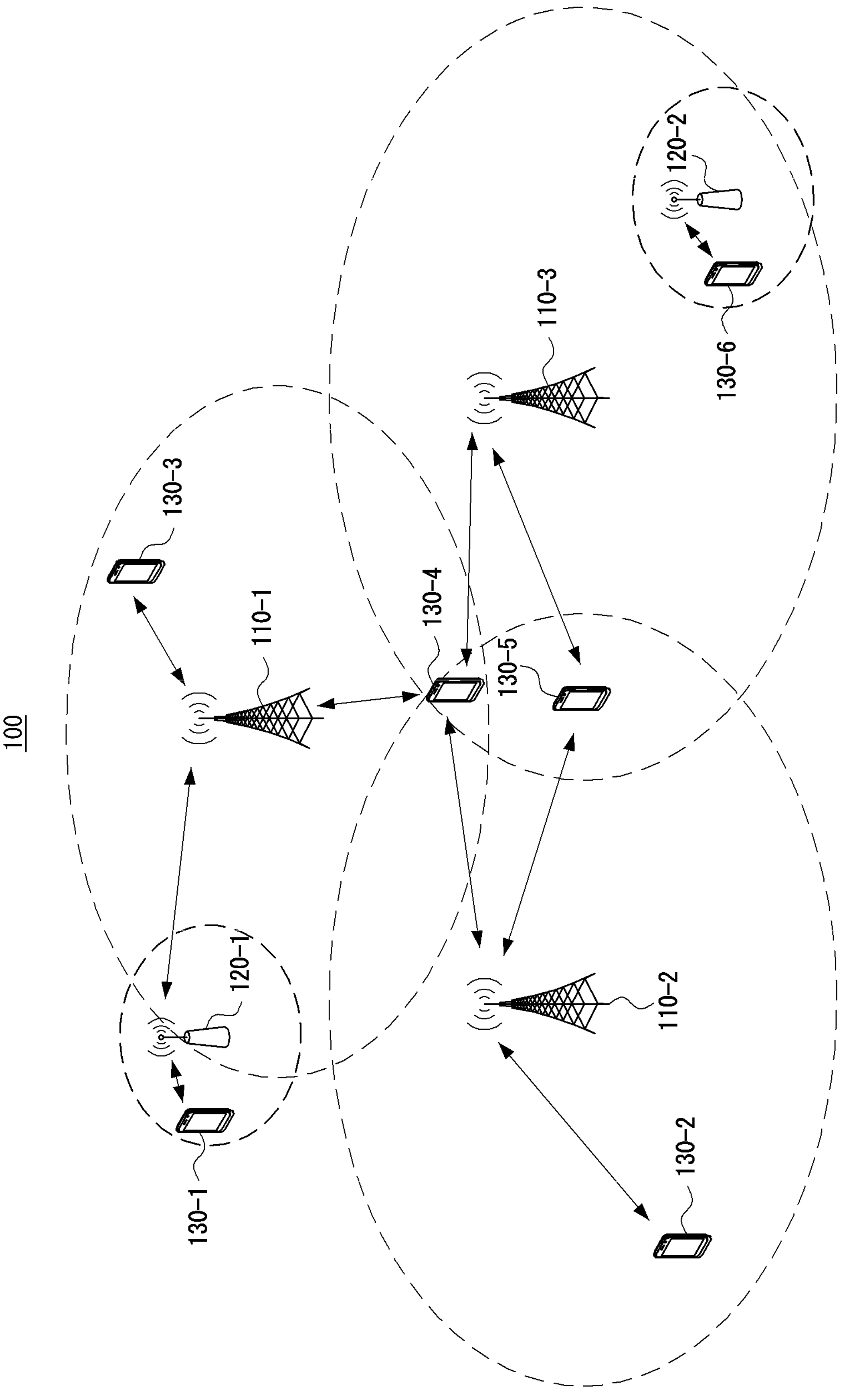
FIG. 1 is a conceptual diagram illustrating a first exemplary embodiment of a communication system.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA)

based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
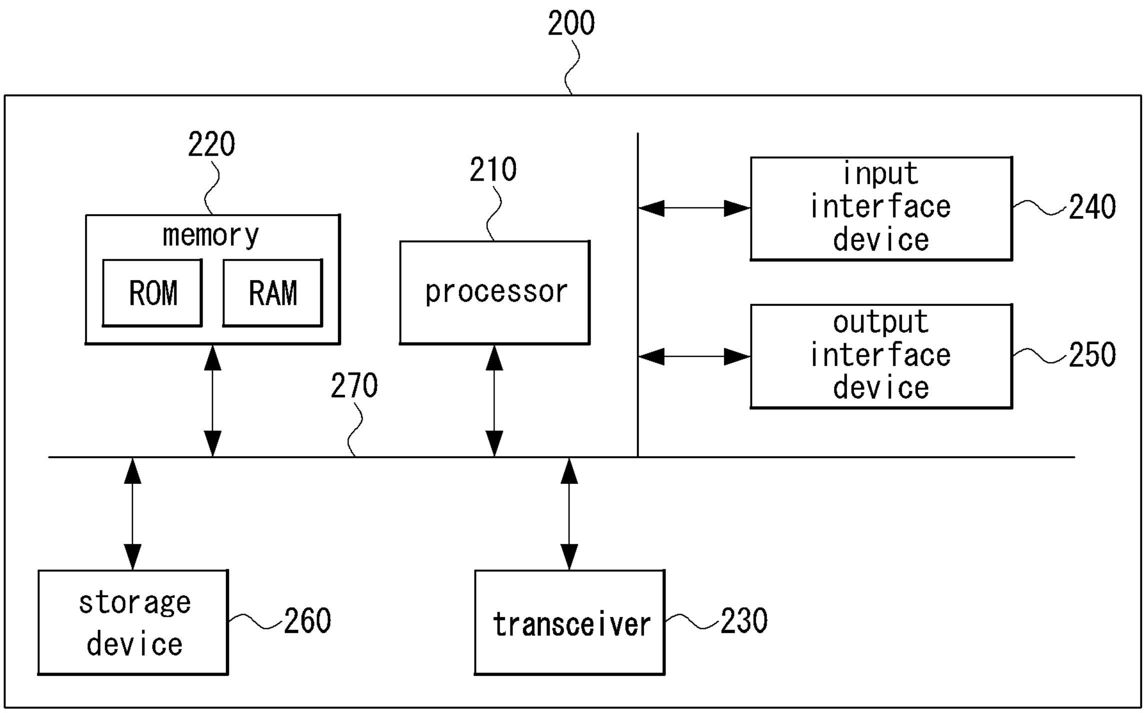
FIG. 2 is a block diagram illustrating a first exemplary embodiment of a communication node constituting a communication system.

FIG. 2 is a block diagram illustrating a first embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, radio signal transmission and reception methods in a communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a receiving node is described, a corresponding transmitting node may perform an operation corresponding to the operation of the receiving node. Conversely, when an operation of a transmitting node is described, a corresponding receiving node may perform an operation corresponding to the operation of the transmitting node.

Figure 3:
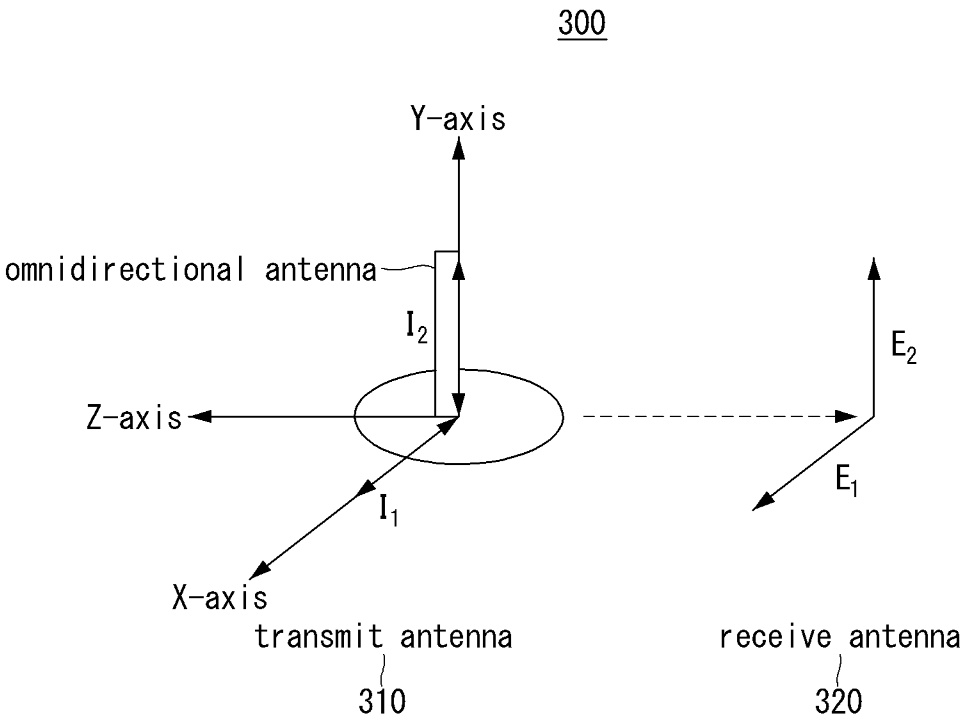
FIG. 3 is a conceptual diagram for describing an exemplary embodiment of a radio signal transmission/reception method using an omnidirectional antenna in a communication system.

FIG. 3 is a conceptual diagram for describing an exemplary embodiment of a radio signal transmission/reception method using an omnidirectional antenna in a communication system.

Referring to FIG. 3, an exemplary embodiment of a communication system 300 may support radio signal transmission/reception using an omnidirectional antenna or an Omni antenna. In other words, an exemplary embodiment of the communication system 300 may support radio signal transmission/reception using a non-polarized antenna.

The communication system 300 may include a first communication node and a second communication node. The first communication node may include a transmit antenna 310. The second communication node may include a receive antenna 320. The first communication node may transmit a radio signal using the transmit antenna 310 as a transmitting node, and the second communication node may receive the radio signal using the receive antenna 320 as a receiving node. Meanwhile, the first communication node may further include a receive antenna (not shown), and the second communication node may further include a transmit antenna (not shown). In this case, the second communication node may transmit a radio signal using the transmit antenna (not shown) as a transmitting node, and the first communication node may receive the radio signal using the receive antenna (not shown) as a receiving node.

The transmit antenna 310 included in the first communication node may correspond to an omnidirectional antenna. The transmit antenna 310 may form a radio signal in a specific direction or in all directions. For example, the transmit antenna 310 may generate a first radio signal having an electric field in the X-axis direction by generating a current of $I_1$ in the X-axis direction. When the first radio signal is received by the receive antenna 320, an electric field of $E_1$ in the X-axis direction may be excited at the receive antenna 320 by the first radio signal. The receive antenna 320 may obtain or extract information by converting the excited electric field into an electrical signal.

Meanwhile, the transmit antenna 310 may generate a second radio signal having an electric field in the Y-axis direction by generating a current of $I_2$ in the Y-axis direction. When the second radio signal is received by the receive antenna 320, an electric field of $E_2$ in the Y-axis direction may be excited at the receive antenna 320 by the second radio signal.

On the other hand, the transmit antenna 310 may generate a current of $I_1$ in the X-axis direction and a current of $I_2$ in the Y-axis direction, thereby generating a third radio signal having an electric field of an X-axis direction component and a Y-axis direction component. When the third radio signal is received by the receive antenna 320, an electric field having an X-axis direction component $E_1$ and a Y-axis direction component $E_2$ may be excited at the receive antenna 320 by the third radio signal.

Figure 4A:
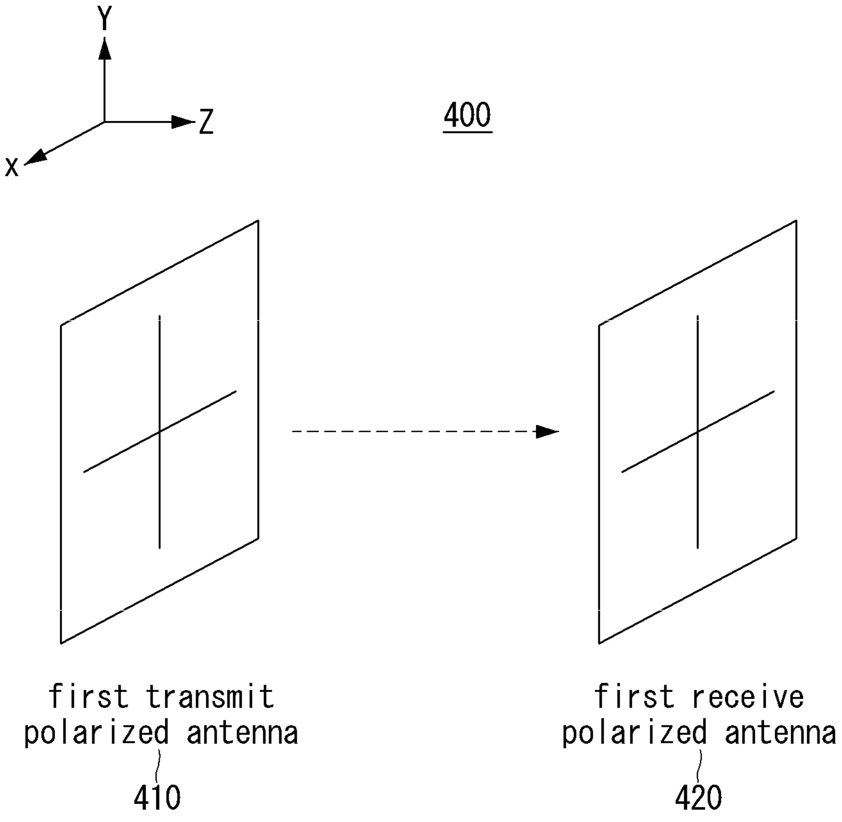
FIGS. 4A and 4B are conceptual diagrams for describing a difference in a reception result according to an alignment state between a transmit polarized antenna and a receive polarized antenna in an exemplary embodiment of a communication system.
Figure 4B:
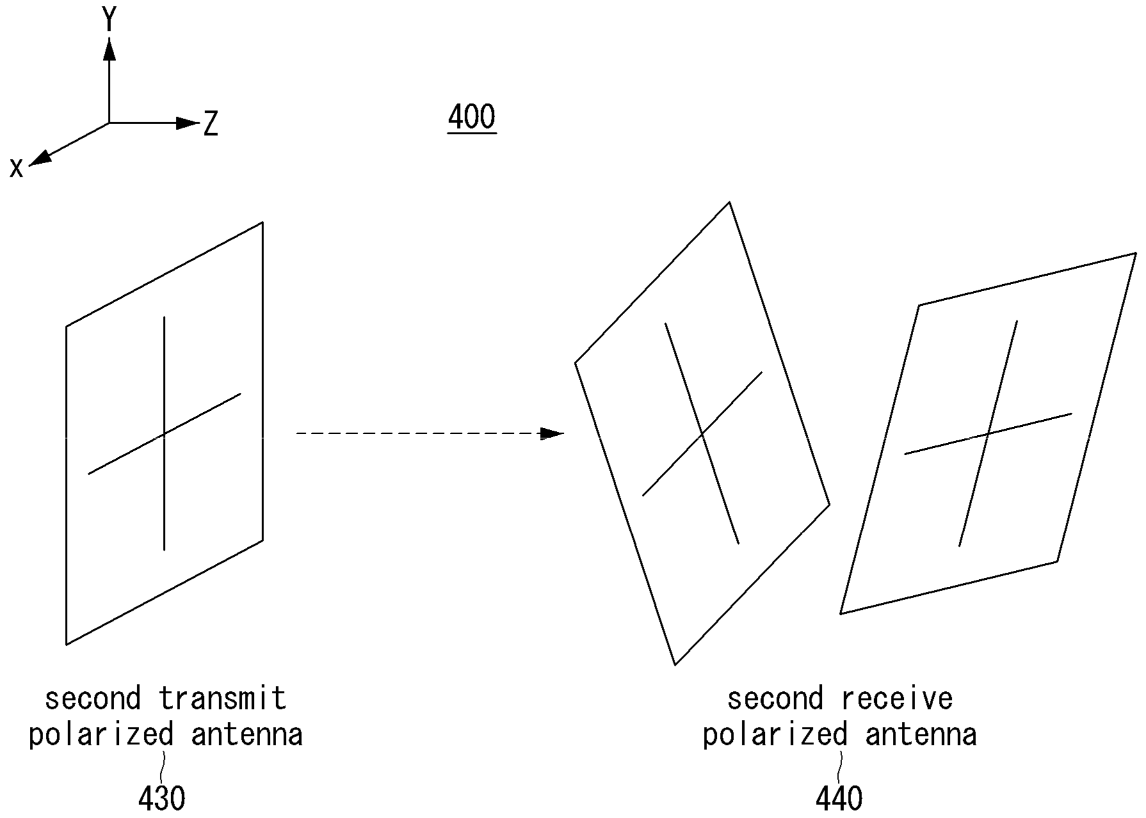

FIGS. 4A and 4B are conceptual diagrams for describing a difference in a reception result according to an alignment state between a transmit polarized antenna and a receive polarized antenna in an exemplary embodiment of a communication system.

Referring to FIGS. 4A and 4B, an exemplary embodiment of a communication system may support polarization-based communication. In an exemplary embodiment of a communication system supporting polarization-based communication, a transmit antenna included in a transmitting node and/or a receive antenna included in a receiving node may correspond to a polarized antenna.

Polarization may mean a polarity generated by an electric field on a plane perpendicular to an electromagnetic wave propagation axis when an electromagnetic wave propagates. A polarized antenna may have one or more polarization axes. A polarized antenna may transmit or receive a radio signal based on one or more polarization axes.

A transmit polarized antenna may transmit a radio signal based on one or more polarization axes. A transmit polarized antenna having one polarization axis may always transmit radio signals polarized in the same direction as the one polarization axis. On the other hand, a transmit polarized antenna having a plurality of polarization axes may transmit radio signals polarized in the same direction as one of the plurality of polarization axes. A transmit polarized antenna may generate and transmit radio signals polarized in the same directions as one or more polarization axes. Alternatively, the transmit polarized antenna may polarize the generated radio signals based on one or more polarization axes, and transmit the polarized radio signals.

A receive polarized antenna may receive a radio signal based on one or more polarization axes. A receive polarized antenna having one polarization axis may receive a component in the same direction as the one polarization axis in radio signals arriving at the received polarized antenna. Meanwhile, a receive polarized antenna having a plurality of polarization axes may receive components in the same directions as at least some of the plurality of polarization axes in radio signals arriving at the receive polarized antenna.

Hereinafter, taking a case where each of the transmit polarized antenna and the receive polarized antenna have two polarization axes as an example, in an exemplary embodiment of a communication system supporting polarization-based communication, a difference in a reception result according to an alignment state between the transmit polarized antenna and the receive polarized antenna will be described. However, this is only an example for convenience of description, and exemplary embodiments of the communication system are not limited thereto.

Referring to FIG. 4A, a communication system 400 may include a first transmit polarized antenna 410 and a first receive polarized antenna 420. A radio signal transmitted by the first transmit polarized antenna 410 may proceed in the Z-axis direction. The first transmit polarized antenna 410 may have a polarization axis coincident with the X-axis and a polarization axis coincident with the Y-axis.

The first transmit polarized antenna 410 and the first receive polarized antenna 420 may have the same transmit/receive polarizations. In other words, the first receive polarized antenna 420 may be aligned in the same direction as the first transmit polarized antenna 410. The polarization axes of the first receive polarized antenna 420 and the polarization axes of the first transmit polarized antenna 410 may be aligned in the same directions.

The first transmit polarized antenna 410 may transmit a first radio signal polarized in the X-axis direction. The first receive polarized antenna 420 may receive the first radio signal. Since the first receive polarized antenna 420 has a polarization axis in the same direction as the X-axis on which the first radio signal is polarized, the first radio signal may be received at the first receive polarized antenna 420 with maximum efficiency.

The first transmit polarized antenna 410 may transmit a second radio signal polarized in the Y-axis direction. The first receive polarized antenna 420 may receive the second radio signal. Since the first receive polarized antenna 420 has a polarization axis in the same direction as the Y axis on which the second radio signal is polarized, the second radio signal may be received at the first receive polarized antenna 420 with maximum efficiency.

Referring to FIG. 4B, the communication system 400 may include a second transmit polarized antenna 430 and a second receive polarized antenna 440. A radio signal transmitted by the second transmit polarized antenna 430 may proceed in the Z-axis direction. The second transmit polarized antenna 430 may have a polarization axis coincident with the X-axis and a polarization axis coincident with the Y-axis.

The second transmit polarized antenna 430 and the second receive polarized antenna 440 may not match the transmit/receive polarizations. In other words, the second receive polarized antenna 440 may not be aligned in the same direction as the second transmit polarized antenna 430. The polarization axes of the second receive polarized antenna 440 and the polarization axes of the second transmit polarized antenna 430 may have different directions.

The second transmit polarized antenna 430 may transmit a third radio signal polarized in the X-axis direction. The second receive polarized antenna 440 may receive the third radio signal. Since the second receive polarized antenna 440 has polarization axes having directions that are not the same as the X-axis on which the third radio signal is polarized, electric field components coincident with the polarization axes of the second receive polarized antenna 440 in the third radio signal may be excited at the second receive polarized antenna 440. That is, the third radio signal may be received at the second receive polarized antenna 440 with an efficiency lower than the maximum efficiency.

The second transmit polarized antenna 430 may transmit a fourth radio signal polarized in the Y-axis direction. The second receive polarized antenna 440 may receive the fourth radio signal. Since the second receive polarized antenna 440 has polarization axes having directions that are not the same as the Y-axis on which the fourth radio signal is polarized, electric field components coincident with the polarization axes of the second receive polarized antenna 440 in the fourth radio signal may be excited at the second receive polarized antenna 440. That is, the fourth radio signal may be received at the second receive polarized antenna 440 with an efficiency lower than the maximum efficiency.

In an exemplary embodiment of a communication system, radio signals transmitted from a transmit polarized antenna (or transmitting node) having a plurality of mutually perpendicular polarization axes may have a plurality of channel degrees of freedom (DoFs) in free space. For example, a first transmitting node may include a transmit polarized antenna having a first polarization axis and a second polarization axis perpendicular to each other. Alternatively, the first transmitting node may include a transmit polarized antenna having a first polarization axis and a transmit polarized antenna having a second polarization axis. A first polarized signal transmitted from the first transmitting node based on the first polarization axis and a second polarized signal transmitted therefrom based on the second polarization axis may not influence each other. In this case, the first transmitting node (or radio signals transmitted from the first transmitting node) may have two channel DoFs. Meanwhile, a second transmitting node may include one transmit polarized antenna having N mutually perpendicular polarization axes, or N transmit polarized antennas each including one of the N mutually perpendicular polarization axes. In this case, the second transmitting node (or radio signals transmitted from the second transmitting node) may have N channel DoFs.

A receiving node may easily receive radio signals transmitted based on different vertical polarization axes without the influence of interference. That is, the first polarized signal transmitted by the first transmitting node based on the first polarization axis and the second polarized signal transmitted by the first transmitting node based on the second polarization axis may not cause mutual interference when received at the receiving node. Meanwhile, the first polarized signal and a third polarized signal transmitted from the second transmitting node based on a third polarization axis perpendicular to the first polarization axis may not cause mutual interference.

In an exemplary embodiment of a communication system, transmission efficiency between a transmitting node and a receiving node may appear differently according to an alignment state between a transmit antenna included in the transmitting node and a receive antenna included in the receiving node. In order to properly align the transmit antenna and the receive antenna with each other, the alignment state of the transmit antenna and/or the receive antenna may need to be adjusted. However, in order to adjust the alignment state of the transmit antenna, a transmit antenna alignment procedure based on feedback from the receive antenna may be required. This may generate additional signaling overhead compared to the exemplary embodiment in which only the alignment state of the receive antenna is adjusted, and the complexity of the communication system may be increased. Accordingly, a technique for effectively adjusting the alignment state of the receive antenna based only on a reception result at the receiving node may be required.

Figure 5:
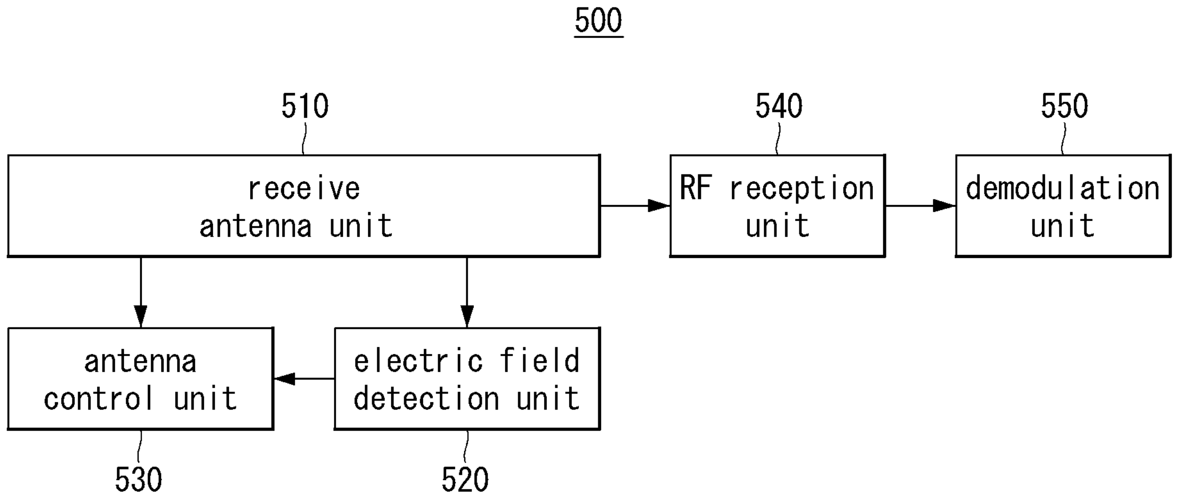
FIG. 5 is a conceptual diagram for describing an exemplary embodiment of a receiving node in a communication system.

FIG. 5 is a conceptual diagram for describing an exemplary embodiment of a receiving node in a communication system.

Referring to FIG. 5, a communication system may include a transmitting node (not shown) including a transmit polarized antenna and a receiving node 500 including a receive polarized antenna. The communication system may be the same as or similar to the communication system 400 described with reference to FIG. 4. The transmit polarized antenna included in the transmitting node (not shown) may be the same as or similar to the first or second transmit polarized antenna 410 or 430 described with reference to FIG. 4. The receive polarized antenna included in the receiving node 500 may be the same as or similar to the first or second receive polarized antennas 420 and 440 described with reference to FIG. 4.

The receiving node 500 may receive a radio signal transmitted from the transmitting node (not shown). When the transmit polarized antenna included in the transmitting node (not shown) and the receive polarized antenna included in the receiving node 500 match the transmission/reception polarizations, a polarized radio signal transmitted by the transmitting node (not shown) using the transmit polarized antenna may be received at the receiving node 500 with maximum efficiency. On the other hand, when the transmit polarized antenna included in the transmitting node (not shown) and the receive polarized antenna included in the receiving node 500 do not match the transmit/receive polarizations, a polarized radio signal transmitted by the transmitting node (not shown) using the transmit polarized antenna may be received at the receiving node 500 with an efficiency lower than the maximum efficiency.

In order to receive the polarized radio signal transmitted from the transmitting node (not shown) with maximum efficiency, the transmitting node (not shown) and the receiving node 500 may have to match transmit/receive polarizations. The receiving node 500 may control one or more polarization axes of the receive polarized antenna to be aligned in the same directions as one or more polarization axes of the transmit polarized antenna included in the transmitting node 500.

Specifically, in an exemplary embodiment of the communication system, the receiving node 500 may include a receive antenna unit 510, an electric field detection unit 520, an antenna control unit 530, an RF reception unit 540, a demodulation unit 550, and the like. The receive antenna unit 510 may include one or more receive polarized antennas.

The electric field detection unit 520 may detect an electric field excited by a first radio signal received at one or more receive polarized antennas included in the receive antenna unit 510. The electric field detection unit may detect the magnitude and direction of the electric field excited by the first radio signal.

The first radio signal may correspond to a polarized radio signal transmitted from the transmitting node (not shown) through the transmit polarized antenna. The antenna control unit 530 may control at least some of the one or more receive polarized antennas to be aligned in the same direction as the first radio signal based on the detection result by the electric field detection unit 520. In other words, the antenna control unit 530 may control the directions of the polarization axes of at least some of the one or more receive polarized antennas to match the direction in which the first radio signal is polarized. Accordingly, at least some of the polarization axes included in the aligned receive polarized antennas may have a direction that coincides with the direction in which the first radio signal is polarized.

The receiving node 500 may receive a second radio signal through the receive polarized antenna aligned by the antenna control unit 530. The second radio signal may mean the same signal as the first radio signal or a retransmitted signal of the first radio signal. Alternatively, the second radio signal may mean a radio signal transmitted by being polarized in the same direction as the first radio signal by the transmitting node 500. The RF reception unit 540 may acquire an electrical signal based on the electric field excited by the second radio signal received through the receive antenna unit 510. The demodulation unit 550 may acquire information desired to be transmitted from the transmitting node (not shown) to the receiving node 500 by demodulating the electrical signal obtained from the RF reception unit 540.

Figure 6A:
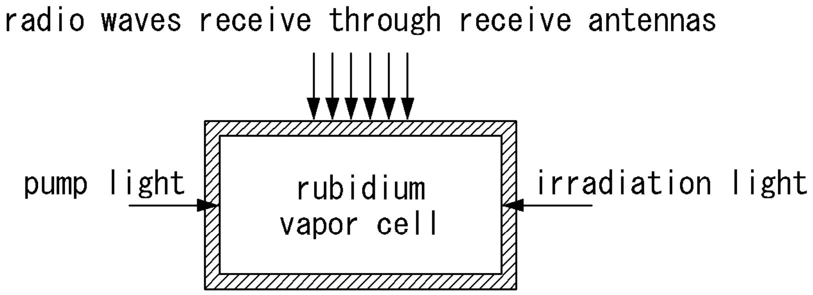
FIGS. 6A and 6B are conceptual diagrams for describing an exemplary embodiment of an electric field detection unit included in a receiving node in a communication system.
Figure 6B:
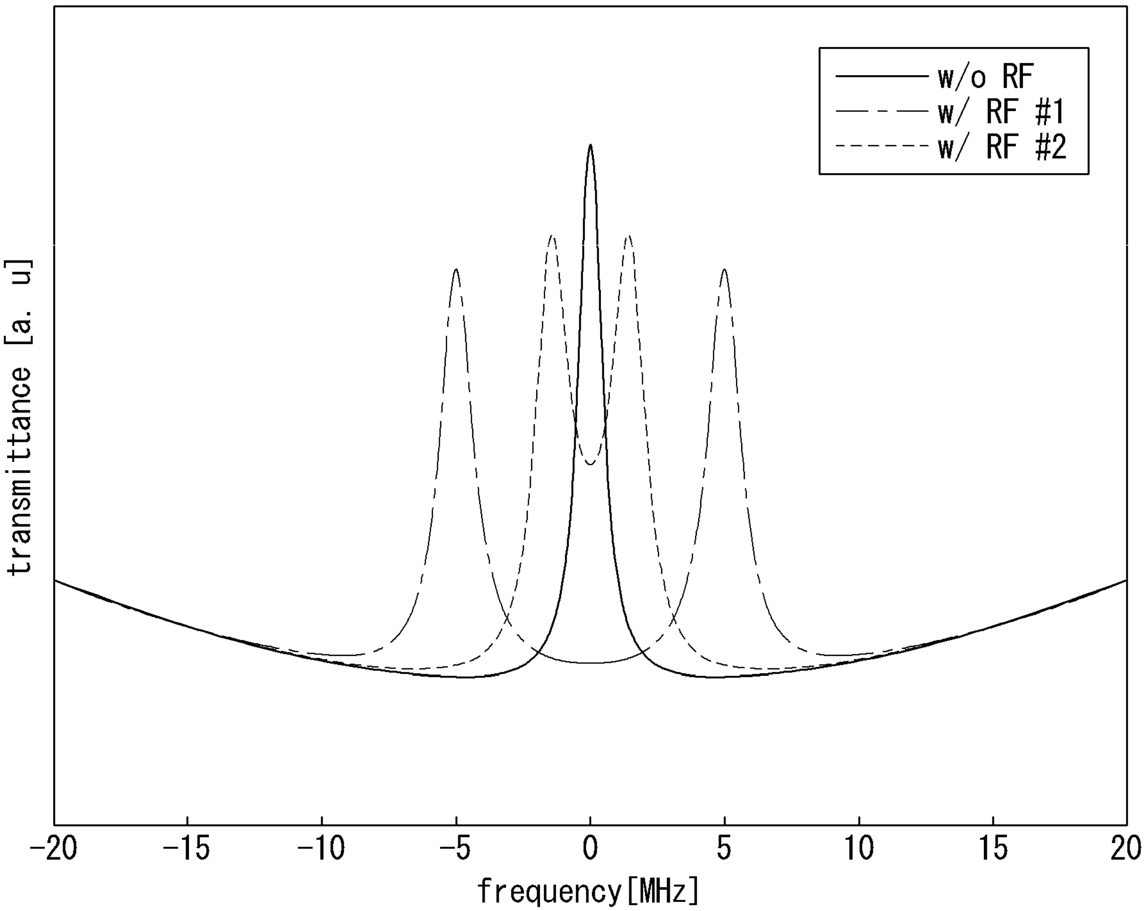

FIGS. 6A and 6B are conceptual diagrams for describing an exemplary embodiment of an electric field detection unit included in a receiving node in a communication system.

Referring to FIGS. 6A and 6B, a receiving node in a communication system may include an electric field detection unit. Here, the receiving node may be the same as or similar to the receiving node 500 described with reference to FIG. 5. The electric field detection unit may be the same as or similar to the electric field detection unit 520 described with reference to FIG. 5.

The electric field detection unit may be used to detect an electric field or a microwave. The electric field detection unit may detect an electric field excited by an RF signal received by the receiving node using one or more receive polarized antennas. Hereinafter, the electric field detection unit will be described with an example in which the electric field detection unit detects an electric field using a rubidium vapor cell. However, exemplary embodiments of the electric field detection unit are not limited thereto.

Referring to FIG. 6A, the electric field detection unit may include a rubidium vapor cell. The rubidium vapor cell may contain rubidium (Rb) vapor, and may be used for detecting an electric field such as a micro electric field. When the rubidium vapor cell is irradiated with pump light and irradiation light, a Rydberg electromagnetically induced transmission (EIT) state may be derived. The electric field detection unit may generate a Rydberg EIT state by irradiating pump light and irradiation light to the rubidium vapor cell. According to the magnitude of the electric field excited in the rubidium vapor cell in the Rydberg EIT state, an Autler-Townes (AT)-splitting phenomenon in which an EIT signal is split may occur variably.

Referring to FIG. 6B, it can be seen that a change in transmittance measurement result according to a frequency in the rubidium vapor cell based on the variably occurring AT-splitting phenomenon is shown. Referring to FIG. 6B, the transmittance measurement results may appear when an electric field is not excited by an RF signal (without RF), when an electric field is excited by an RF signal #1 (with RF #1), and when an electric field is excited by an RF signal #2 (with RF #2). Here, the electric field excited by the RF signal #2 may be greater than the electric field excited by the RF signal #1. The greater the magnitude of the electric field excited by the RF signal, the stronger the AT-splitting phenomenon may appear. The electric field detection unit may detect the magnitude of the electric field of the RF signal received by the receiving node based on the AT-splitting phenomenon that occurs variably according to the magnitude of the electric field in the rubidium vapor cell.

In FIGS. 6A and 6B, the exemplary embodiment in which the electric field detection unit detects the magnitude of the electric field excited (or applied) by a radio signal received at the receiving node has been described. However, this is only an example for convenience of description, and exemplary embodiments of the electric field detection unit are not limited thereto. For example, the electric field detection unit may detect or identify the magnitude, direction, change pattern of the magnitude, change pattern of the direction, and the like of the electric field excited by the radio signal received at the receiving node. When the electric field detection unit is configured to detect only the magnitude of the electric field, there is an advantage that the configuration cost and complexity of the receiving node and the communication system are reduced. On the other hand, when the electric field detection unit is configured to detect the magnitude, direction, change pattern of the magnitude, change pattern of the direction, and the like of the electric field, there is an advantage that the antenna alignment state adjustment performance at the receiving node can be improved.

Figure 7A:
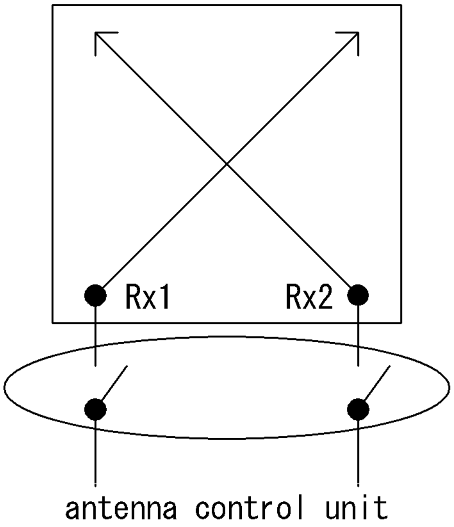
FIGS. 7A and 7B are conceptual diagrams for describing exemplary embodiments of an antenna control unit included in a receiving node in a communication system.
Figure 7B:
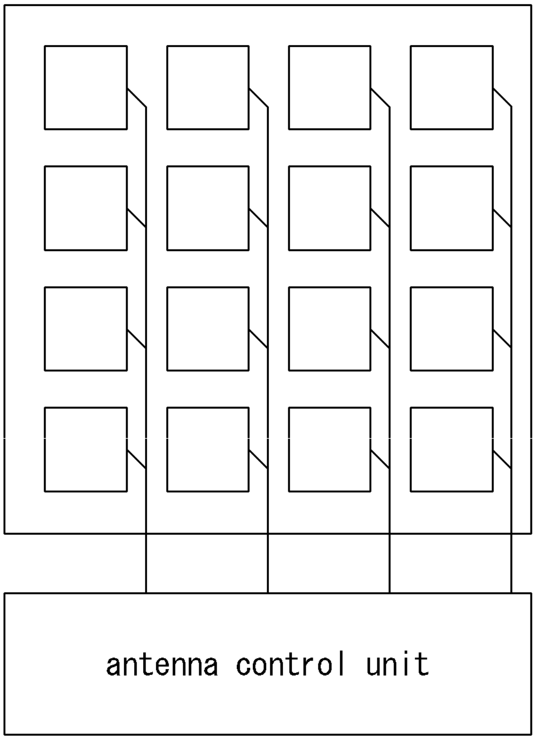

FIGS. 7A and 7B are conceptual diagrams for describing exemplary embodiments of an antenna control unit included in a receiving node in a communication system.

Referring to FIGS. 7A and 7B, a receiving node in a communication system may include an antenna control unit. Here, the receiving node may be the same as or similar to the receiving node 500 described with reference to FIG. 5. The antenna control unit may be the same as or similar to the antenna control unit 530 described with reference to FIG. 5. The antenna control unit may be used to adjust an alignment state of one or more receive antennas included in the receiving node or an alignment state of polarization axes of the one or more receive antennas.

Referring to FIG. 7A, the antenna control unit may control a plurality of receive polarized antennas. Hereinafter, an exemplary embodiment of the antenna control unit will be described with reference to a case in which the antenna control unit controls two receive polarized antennas Rx1 and Rx2 as an example. However, this is only an example for convenience of description, and exemplary embodiments of the antenna control unit are not limited thereto.

The antenna control unit may control a first receive polarized antenna Rx1 and a second receive polarized antenna Rx2 included in the receive antenna unit. Here, the first receive polarized antenna Rx1 and the second receive polarized antenna Rx2 may have polarization axes in different directions. The antenna control unit may determine whether to turn on/off each of the first receive polarized antenna Rx1 and the second receive polarized antenna Rx2. Depending on whether each of the first receive polarized antenna Rx1 and the second receive polarized antenna Rx2 is turned on/off, an electric field detection result by the electric field detection unit may vary. The following plurality of cases may be determined according to whether each of the first receive polarized antenna Rx1 and the second receive polarized antenna Rx2 is turned on/off.

[Case 1] Rx1: ON, Rx2: OFF

[Case 2] Rx1: OFF, Rx2: ON

[Case 3] Rx1: ON, Rx2: ON

[Case 4] Rx1: OFF, Rx2: OFF

In Case 1, the electric field detection unit may detect only an electric field excited at the first receive polarized antenna Rx1. In Case 2, the electric field detection unit may detect only an electric field excited at the second receive polarized antenna Rx2. In Case 3, the electric field detection unit may detect a sum (e.g., scalar sum or vector sum) of electric fields excited at the first receive polarized antenna Rx1 and the second receive polarized antenna Rx2. In Case 4, the electric field detection unit may not detect an electric field excited at the first receive polarized antenna Rx1 and the second receive polarized antenna Rx2.

The antenna control unit may determine an optimal antenna alignment position based on the measurement result for each case. The antenna control unit may control the receive antenna unit (or the first receive polarized antenna Rx1 and the second receive polarized antenna Rx2) so that a polarized radio signal (hereinafter, first radio signal) is received with maximum efficiency.

For example, the antenna control unit may identify one receive polarized antenna having a polarization axis in a direction relatively similar to the direction in which the first radio signal is polarized, among the first receive polarized antenna Rx1 and the second receive polarized antenna Rx2. The antenna control unit may control the first receive polarized antenna Rx1 and the second receive polarized antenna Rx2 so that the first radio signal is received through one receive polarized antenna having a polarization axis in a direction relatively similar to the direction in which the first radio signal is polarized. The state of having a polarization axis in a relatively similar direction to the direction in which the first radio signal is polarized may be expressed as a 'relatively favorable alignment state'. A state of having a polarization axis in a direction that is not relatively similar to the direction in which the first radio signal is polarized may be expressed as a 'relatively unfavorable alignment state'.

Meanwhile, the antenna control unit may adjust the alignment state of at least a portion of the first receive polarized antenna Rx1 and the second receive polarized antenna Rx2, so that the polarization axes of the first receive polarized antenna Rx1 and/or the second receive polarized antenna are aligned based on the direction in which the first radio signal is polarized. Alternatively, the antenna control unit may adjust the alignment state of the entire receive antenna unit including the first receive polarized antenna Rx1 and the second receive polarized antenna Rx2 having polarization axes in different directions so that the first radio signal is received with the maximum efficiency.

As such, the antenna control unit may perform electric field measurement by controlling the on/off states (in other words, switching state) and the alignment state of one or more receive polarized antennas constituting the receive antenna unit, or controlling the alignment state of the receive antenna unit, so that the first radio signal is received at the receive antenna unit with maximum efficiency. The antenna control unit may determine an optimal alignment state through this.

Referring to FIG. 7B, the antenna control unit may control antennas supporting beam-based communication. An antenna supporting beam-based communication may have a high reception gain under a LOS condition and a low reception gain under a NLOS condition. In beam-based communication, when the LOS condition is satisfied and a transmit antenna of a transmitting node and a receive antenna of a receiving node are aligned on a plane perpendicular to the mutual radio signal propagation direction, the reception efficiency may be maximized. Hereinafter, an exemplary embodiment of the antenna control unit will be described by taking as an example a case in which the antenna control unit controls a patch antenna composed of one or more patches for beam-based communication. However, this is only an example for convenience of description, and exemplary embodiments of the antenna control unit are not limited thereto.

The antenna control unit may be included in the receive antenna unit and may control the patch antenna composed of one or more patches. Here, the patch antenna may be used for beam-based communication to improve transmission/reception gain. The antenna control unit may determine an antenna alignment position in an optimal state based on a measurement result of a received signal for each alignment state of the patch antenna. The antenna control unit may control the patch antenna (or a receive antenna unit including the patch antenna) so that a radio signal (hereinafter, second radio signal) is received with maximum efficiency.

For example, the antenna control unit may adjust the alignment state of the patch antenna in a direction in which a reception strength of the second radio signal is maximized.

In this manner, the antenna control unit may perform electric field measurement while controlling the alignment state of the patch antenna or the alignment state of the receive antenna unit so that the second radio signal is received at the patch antenna with maximum efficiency. The antenna control unit may determine an optimal alignment state through this.

Meanwhile, a communication node may include a plurality of patch antennas supporting beam-based communication. In this case, similarly to that described with reference to FIG. 7A, the antenna control unit may determine an optimal alignment state by controlling whether to turn on/off and an alignment state of each of the plurality of patch antennas, or an alignment state of the receive antenna unit.

Figure 8:
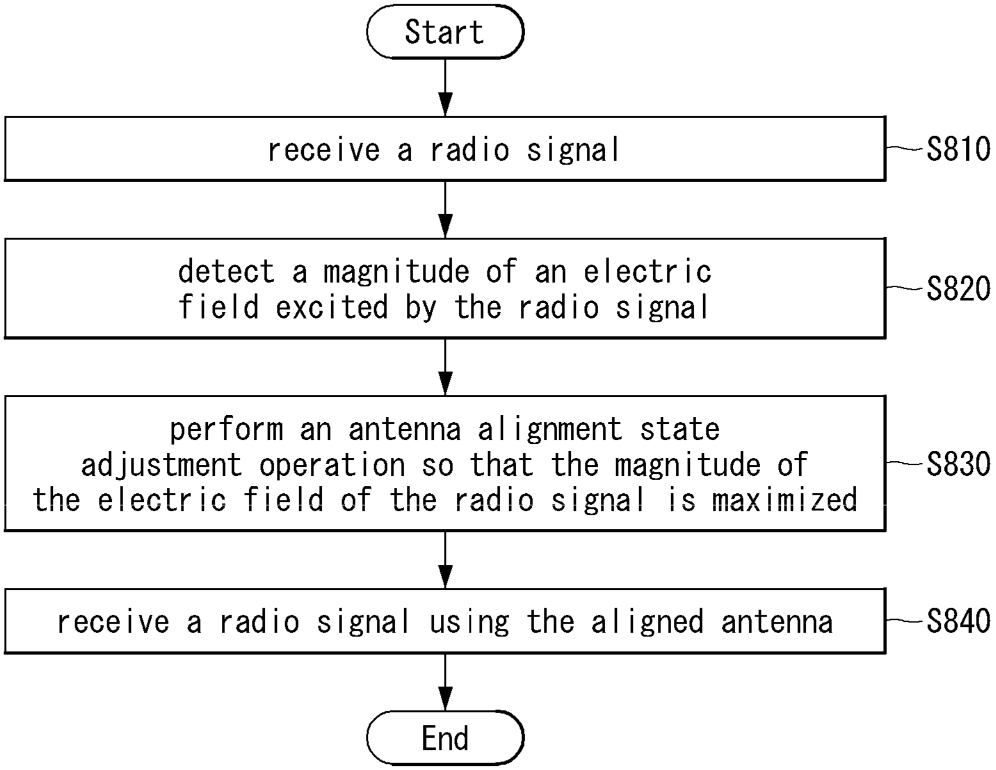
FIG. 8 is a flowchart illustrating an exemplary embodiment of a method for transmitting and receiving radio signals in a communication system.

FIG. 8 is a flowchart illustrating an exemplary embodiment of a method for transmitting and receiving radio signals in a communication system.

Referring to FIG. 8, in a communication system, a first communication node may receive a radio signal transmitted from a second communication node. The first communication node may be the same as or similar to the receiving node 500 described with reference to FIG. 5. The second communication node may be the same as or similar to the transmitting node described with reference to FIG. 5.

The first communication node may include an electric field detection unit that is the same as or similar to the electric field detection unit 520 described with reference to FIG. 5 or the electric field detection unit described with reference to FIG. 6. Alternatively, the first communication node may perform electric field detection on a received signal in the same or similar manner as the electric field detection unit 520 described with reference to FIG. 5 or the electric field detection unit described with reference to FIG. 6. The first communication node may include an antenna control unit that is the same as or similar to the antenna control unit 530 described with reference to FIG. 5 or the antenna control unit described with reference to FIGS. 7A and 7B. Alternatively, the first communication node may perform antenna control in the same or similar manner as the antenna control unit 530 described with reference to FIG. 5 or the antenna control unit described with reference to FIGS. 7A and 7B. Hereinafter, in describing an exemplary embodiment of a method for transmitting and receiving radio signals with reference to FIG. 8, content overlapping with those described with reference to FIGS. 5 to 7B may be omitted.

The second communication node may transmit one or more radio signals using one or more transmit antennas. The first communication node may receive the one or more radio signals transmitted from the second communication node (S810). In an exemplary embodiment of the communication system, each of the one or more radio signals received in step S810 may correspond to a polarized radio signal transmitted after being polarized in the second communication node. In an exemplary embodiment of the communication system, each of the one or more radio signals received in step S810 may correspond to a radio signal transmitted by a beamforming scheme from the second communication node.

The first communication node may detect (or measure) magnitude(s) of electric field(s) of the one or more radio signals (i.e., one or more received signals) received in step S810 (S820). The operation of detecting the electric field magnitude(s) of the received signals in step S820 may be performed in the same or similar manner as the operation of the electric field detection unit described with reference to FIGS. 6A and 6B.

Based on the detection result in step S820, the first communication node may align the receive antenna so that the electric field magnitudes of the received signals are maximized (S830). The receive antenna alignment operation in step S830 may be performed in the same or similar manner as the operation of the antenna control unit described with reference to FIGS. 7A and 7B.

The first communication node may receive a radio signal transmitted from the second communication node by using the receive antenna aligned through step S830 (S840). In an exemplary embodiment of the communication system, the radio signal received in step S840 may mean the same signal as the radio signal received in step S810. In an exemplary embodiment of the communication system, the radio signal received in step S840 may mean a retransmitted signal of the radio signal received in step S810. In an exemplary embodiment of the communication system, the radio signal received in step S840 may mean a radio signal transmitted by being polarized in the same direction as the radio signal received in step S810. In an exemplary embodiment of the communication system, the radio signal received in step S840 may mean a radio signal transmitted by beamforming in the same manner as the radio signal received in step S810.

In an exemplary embodiment of the communication system, one or more radio signals received by the first communication node from the second communication node in step S810 may correspond to signals transmitted for the receive antenna adjustment operation. For example, the second communication node may transmit one or more radio signals for the receive antenna adjustment operation at the first communication node. The first communication node may perform the receive antenna adjustment operation according to step S830 based on the one or more radio signals received in step S810. Here, the first communication node may transmit a first indication signal to the second communication node between steps S830 and S840. Here, the first indication signal may indicate that the receive antenna alignment state adjustment operation according to step S830 is completed in the first communication node. The second communication node may receive the first indication signal. The second communication node may recognize that the receive antenna alignment state adjustment operation in the first communication node is completed based on the received first indication signal. Thereafter, as in step S840, the second communication node may transmit a radio signal including information desired to be transmitted to the first communication node to the first communication node.

It can be seen that FIG. 8 shows an exemplary embodiment in which the operations according to steps S810 to S830 are performed separately or in time series. However, this is only an example for convenience of description, and exemplary embodiments of the method for transmitting and receiving radio signals are not limited thereto. For example, in performing the receive antenna alignment operation according to step S830, the radio signal reception operation according to operation S810 and the electric field detection operation according to operation S820 may be repeatedly or continuously performed. Through this, the first communication node may select an receive antenna alignment state corresponding to an optimal detection result among various detection results obtained while variously changing the electric field detection condition (e.g., alignment state of or whether to turn on/off each or all of the one or more receive antennas, etc.).

For example, in an exemplary embodiment of a communication system supporting polarization-based communication, the second communication node may transmit one or more polarized radio signals using one or more transmit polarized antennas. In step 810, the first communication node may receive the one or more polarized radio signals transmitted from the second communication node through one or more receive polarized antennas included in the first communication node. In steps 820 and 830, the first communication node may perform a receive polarized antenna alignment state adjustment operation so that a detection result for a magnitude of an electric field excited by the one or more polarized radio signals is maximized. In step 840, the first communication node may receive a first polarized signal transmitted from the second communication node through at least part of the one or more receive polarized antennas based on a result of the receive polarized antenna alignment state adjustment operation.

Specifically, in steps 820 and 830, the first communication node may obtain a first detection result through electric field detection when an alignment state of the one or more receive polarized antennas is a first alignment state. In addition, the first communication node may obtain a second detection result through electric field detection after changing the alignment state of the one or more receive polarized antennas to a second alignment state. The first communication node may select a relatively favorable alignment state among the first alignment state and the second alignment state based on a result of comparison between the first detection result and the second detection result. The first communication node may determine an alignment state of the one or more receive polarized antennas based on the selected alignment state. Alternatively, the first communication node may calculate an optimal detection result in which the electric field detection result is maximized, based on the result of comparison between the first detection result and the second detection result. The first communication node may determine an alignment state of the one or more receive polarized antennas based on the calculated optimal detection result.

Alternatively, the one or more receive polarized antennas included in the first communication node may include at least a first receive polarized antenna and a second receive polarized antenna. Here, the first communication node may perform electric field detection while changing whether to turn on/off each of the first and second receive polarized antennas, in a situation in which a third alignment state corresponding to a polarization axis direction of the first receive polarized antenna and a fourth alignment state corresponding to a polarization axis direction of the second receive polarized antenna are different from each other. The first communication node may select one of the third alignment state and the fourth alignment state based on a result of the electric field detection. The first communication node may determine to receive the first polarized signal through one receive polarized antenna corresponding to the selected alignment state. Alternatively, the first communication node may select a relatively favorable alignment state (hereinafter, 'fifth alignment state') and a relatively unfavorable alignment state (hereinafter, 'sixth alignment state') among the third and fourth alignment states. In this case, the first communication node may adjust a direction of a receive polarized antenna corresponding to the sixth alignment state based on the fifth alignment state.

Alternatively, the one or more receive antennas included in the first communication node may include at least a first receive antenna and a second receive antenna. Here, the first communication node may perform electric field detection while changing whether to turn on/off each of the first and second receive antennas, in a situation in which a third alignment state corresponding to a beam receiving direction of the first receive antenna and a fourth alignment state corresponding to a beam receiving direction of the second receive antenna are different from each other. The first communication node may select one of the third alignment state and the fourth alignment state based on a result of the electric field detection. The first communication node may determine to receive the first radio signal through one receive antenna corresponding to the selected alignment state. Alternatively, the first communication node may select a relatively favorable alignment state (hereinafter, 'fifth alignment state') and a relatively unfavorable alignment state (hereinafter, 'sixth alignment state') among the third and fourth alignment states. In this case, the first communication node may adjust a direction of a receive antenna corresponding to the sixth alignment state based on the fifth alignment state.

Through the operations according to steps S810 to S840, the receive antenna of the first communication node may be adjusted so that the radio signal transmitted on the basis of polarization and/or the radio signal transmitted on the basis of beamforming from the second communication node is received with maximum efficiency at the first communication node. Through the operations according to steps S810 to S840, transmission/reception efficiency between the first and second communication nodes may be maximized through only the receive antenna control procedure in the first communication node. That is, the transmission/reception efficiency between the first and second communication nodes can be maximized without a feedback procedure of the first communication node for the second communication node corresponding to the transmitting node, or a separate antenna adjustment procedure in the second communication node.

The first communication node may obtain an electrical signal based on the electric field excited by the radio signal received in step S840. This may be the same as or similar to the operation of the RF reception unit 540 described with reference to FIG. 5. The first communication node may obtain information desired to be transmitted from the second communication node to the first transmission node by demodulating the obtained electrical signal. This may be the same as or similar to the operation of the demodulation unit 550 described with reference to FIG. 5. The first communication node can easily restore the information desired to be transmitted from the second communication node by demodulating the electrical signal obtained based on the radio signal received with the reception efficiency maximized through the receive antenna adjustment as described above.

In an exemplary embodiment of the communication system, a transmitting node and/or a receiving node may be provided with a plurality of antennas for transmitting and receiving radio signals in order to increase channel capacity. For example, in an exemplary embodiment of the communication system, a multiple-input multiple-output (MIMO) antenna system may be used. In order to improve communication performance based on the MIMO antenna system, there may be constraints such as a space constraint in which transmit antennas and receive antennas should be spaced apart from each other by a predetermined distance or more. In order to improve communication performance based on the MIMO antenna system, a polarization-based communication technology and/or a beam-based communication technology may be applied.

In an exemplary embodiment of the communication system, the communication performance can be improved by acquiring a channel DoF based on transmit polarized antennas and/or receive polarized antennas. Meanwhile, in an exemplary embodiment of the communication system, the communication performance can be improved based on radio signal transmission/reception based on beamforming under LOS conditions. However, in polarization-based communication and/or beam-based communication, the transmission efficiency between the transmitting node and the receiving node may appear differently depending on an alignment state between the transmit antenna and the receive antenna.

According to the exemplary embodiments of a communication system described with reference to FIGS. 5 to 8, a receiving node may include a receive antenna unit, an electric field, an RF reception unit, a demodulation unit, and the like. The receiving node may receive one or more radio signals through the receive antenna unit. The receiving node may acquire one or more electrical signals based on electric field excited by the one or more received radio signals by the RF reception unit. The receiving unit may acquire information based on the one or more acquired electrical signals by the demodulation unit.

The receiving node may adjust an alignment state of the receive antenna unit based on detection results of electric fields excited by the one or more radio signals transmitted from a transmitting node. If the receiving node adjusts the alignment state of the receive antenna unit based on detection results detected by the RF reception unit, a complexity of an adjustment operation may be high, and a complexity of a cost of the receiving node configuration may be high.

On the other hand, the receiving node may further include an electric field detection unit which is able to detect magnitudes of electric fields with a low complexity, in addition to the RF reception unit. The receiving node may adjust the alignment state of the receive antenna unit based on detection results of electric fields detected by the electric field detection unit in real time and/or continuously. If the receiving node is configured in the above-described way, the complexity of an adjustment operation may be low, and the complexity of the cost of the receiving node configuration may be low.

According to the exemplary embodiments of a method and apparatus for transmitting and receiving radio signals in a communication system, in a communication system supporting polarization-based communication and/or beam-based communication, an alignment state of a receive antenna of a receiving node may be adjusted based on a result of electric field measurement on a received signal. Through this, transmission/reception efficiency between a transmitting node and the receiving node can be maximized without a separate feedback procedure for the transmitting node or a separate antenna adjustment procedure at the transmitting node.

However, the effects that can be achieved by the radio signal transmission and reception method and apparatus in the communication system according to the exemplary embodiments of the present disclosure are not limited to those mentioned above, and other effects not mentioned may be clearly understood by those of ordinary skill in the art to which the present disclosure belongs from the configurations described in the present disclosure.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. An operation method of a first communication node in a communication system, the operation method comprising:

receiving one or more polarized radio signals transmitted from a second communication node included in the communication system through one or more receive polarized antennas included in the first communication node;

performing a receive polarized antenna alignment state adjustment operation so that a detection result for a magnitude of an electric field excited by the one or more polarized radio signals is maximized; and receiving a first polarized signal transmitted from the second communication node through at least part of the one or more receive polarized antennas based on a result of the receive polarized antenna alignment state adjustment operation, wherein the performing of the receive polarized antenna alignment state adjustment operation comprises:

passing an electric field excited by the one or more polarized radio signals through a rubidium vapor cell in a Rydberg electromagnetically induced transparency (EIT) state, the rubidium vapor cell being included in the first communication node; and detecting the magnitude of the electric field based on a degree in which an EIT signal is separated in the rubidium vapor cell.

2. The operation method according to claim 1, wherein the performing of the receive polarized antenna alignment state adjustment operation comprises:

obtaining a first detection result through electric field detection when an alignment state of the one or more receive polarized antennas is a first alignment state;

changing the alignment state of the one or more receive polarized antennas to a second alignment state;

obtaining a second detection result through electric field detection when the alignment state of the one or more receive polarized antennas is the second alignment state; and determining an alignment state of the one or more receive polarized antennas based on a result of comparison between the first detection result and the second detection result.

3. The operation method according to claim 1, wherein the one or more receive polarized antennas include at least a first receive polarized antenna and a second receive polarized antenna, and the performing of the receive polarized antenna alignment state adjustment operation comprises:

performing electric field detection while changing whether to turn on/off each of the first and second receive polarized antennas, in a situation in which a third alignment state of the first receive polarized antenna and a fourth alignment state of the second receive polarized antenna are different from each other;

selecting one of the third alignment state and the fourth alignment state based on a result of the electric field detection; and determining to receive the first polarized signal through one receive polarized antenna corresponding to the selected alignment state.

4. The operation method according to claim 1, wherein the one or more receive polarized antennas include at least a first receive polarized antenna and a second receive polarized antenna, and the performing of the receive polarized antenna alignment state adjustment operation comprises:

performing electric field detection while changing whether to turn on/off each of the first and second receive polarized antennas, in a situation in which alignment states of the first receive polarized antenna and the second receive polarized antenna are different from each other;

selecting a relatively favorable fifth alignment state and a relatively unfavorable sixth alignment state among the alignment states of the first receive polarized antenna and the second receive polarized antenna based on a result of the electric field detection; and adjusting a direction of a receive polarized antenna corresponding to the sixth alignment state based on the fifth alignment state.

5. The operation method according to claim 1, wherein the performing of the receive polarized antenna alignment state adjustment operation further comprises transmitting a first indication signal indicating that the receive polarized antenna alignment state adjustment operation is completed to the second communication node, and the first polarized signal is transmitted from the second communication node based on the first indication signal.

* * * * *